United States Patent [19]

Matoba

[11] Patent Number: 4,674,360
[45] Date of Patent: Jun. 23, 1987

[54] PLANETARY TRANSMISSION WITH AXIAL THRUST PROTECTION MEANS

[75] Inventor: Hideyasu Matoba, Osaka, Japan
[73] Assignee: Matex Co., Ltd., Osaka, Japan
[21] Appl. No.: 778,959
[22] Filed: Sep. 23, 1985

Related U.S. Application Data

[63] Continuation of Ser. No. 523,919, Aug. 16, 1983, abandoned.

[51] Int. Cl.$^4$ ............................................. F16H 3/44
[52] U.S. Cl. .................... 74/750 R; 74/773; 74/781 R; 74/785; 74/789; 74/801
[58] Field of Search ............ 74/750 R, 753, 758–770, 74/773, 776, 780, 781 R, 782–792, 801

[56] References Cited

U.S. PATENT DOCUMENTS 3,424,035 1/1969 Heidrich ............................ 74/801
4,193,325 3/1980 Cotreau ....................... 74/750 R X

FOREIGN PATENT DOCUMENTS 2620570 11/1977 Fed. Rep. of Germany ........ 74/801
163753 10/1982 Japan ..................................... 74/801

Primary Examiner—Kenneth J. Dorner
Assistant Examiner—Dwight G. Diehl
Attorney, Agent, or Firm—Griffin, Branigan, & Butler

[57] ABSTRACT

A planetary transmission (10) is provided having planetary gear assemblies (2) and an unified outer, inner-toothed ring gear assembly (3). The planetary gear assembly (2) engages a sun gear (1) and is comprised of a planetary ring gear (7) sandwiched between front and back thrust discs (6a and 6b). The unified outer, inner-toothed ring gear assembly (3) engages the planetary gear assemblies (2) and is comprised of an outer, inner-toothed annular ring gear (8) part sandwiched between front and back side annular ring parts (9a and 9b). The thrust discs (6a and 6b) are in contact with the side annular ring parts (9a and 9b), and the contact surfaces are complementary. The thrust disc outer diameter (D1) is equal to or, preferably, greater than the planetary ring gear (8) tooth-tip circle diameter (D2). The side annular ring parts (9a and 9b) inner diameter (D3) is equal to or, preferably greater than the tooth-bottom circle diameter (D4) of the outer, inner-toothed ring gear (8). The complementary contact surfaces of the thrust discs (6a and 6b) and the side annular ring parts (9a and 9b) may be cylindrical or frustoconical. With frustoconical surfaces, the frustoconical angle ($\alpha$) may be positive or negative.

8 Claims, 8 Drawing Figures

PLANETARY TRANSMISSION WITH AXIAL THRUST PROTECTION MEANS

BACKGROUND OF THE INVENTION

This is a continuation of application Ser. No. 523,919 filed Aug. 16, 1983 now abandoned.

The invention relates to a planetary transmission employing both planetary gear assemblies and an outer, inner-toothed ring gear assembly. More specifically, the invention relates to a novel planetary transmission employing novel thrust discs and a unified outer ring gear part and side annular ring parts assembly thrust rings in the planetary and outer ring gear assemblies, respectively.

A planetary transmission may be used to provide rotation of an output shaft which is different from the rotation of an input shaft. During the course of rotational input and output of a planetary transmission, unwanted axial thrust forces are often encountered. The thrust forces are transmitted axially along the input or output shafts or within the planetary transmission along the planetary shafts supporting the planetary gear assemblies.

An undesirable result of such axial thrust forces is accelerated wear and defacement of the surfaces of the gear teeth that rub together axially.

Another undesirable result of the axial thrust forces is the misalignment between the planetary ring gear and the outer, inner-toothed ring gear. The misalignment causes overall uneven and excessive transmission wear.

As a means to lessen the effects of axial thrust forces on planetary gear transmissions, bearing assemblies are often employed. Bearing assemblies may be used to absorb axial thrust forces along the input or output shafts.

Oftentimes, however, there is not enough space to install bearing assemblies between a driving motor and a driven mechanism. In such cases, it is necessary for the planetary transmission itself to have some means to moderate the effects of axial thrust forces. One such planetary transmission has planetary gear assemblies with pitch discs and outer, inner-toothed annular ring gear assemblies with pitch rings.

Still another technique is exhibited in Japanese Utility Model Publication No. 16918/55 which describes a planetary transmission employing pitch rollers and pipes. The planetary transmission described therein, however, cannot prevent axial thrust and axial motion between meshing gears because the pitch rollers and pipes are spaced apart from the planetary ring gears and from the outer, inner-toothed ring gear.

Japanese Patent Publication No. 57-163753 (see Prior Art FIG. 7 in the drawings herein) discloses a planetary gear system wherein a planetary ring gear is placed between two pitch discs, and wherein an outer, inner-toothed ring gear is placed between two pitch rings. Here, only the tips of the inner-toothed ring gear teeth are sandwiched between the pitch discs, and only the tips of the planetary ring gear teeth are sandwiched between the pitch rings. Thus, planetary ring gears and the outer, inner-toothed ring gear do not change their relative axial positions in the direction parallel to the shafts. However, the sides of the gear teeth contacting the pitch discs and pitch rings are subject to relatively high frictional forces resulting from slippage between the pitch discs and the pitch rings which are adjacent to the sidewalls of the gears. Although this prior art planetary transmission may be adequate to protect the gears from axial thrust forces when the input and output shafts of the transmission are further provided with bearing assemblies, this type of planetary transmission lacks adequate means for inhibiting the frictional wear of the sides of the gear teeth due to the slippage against the pitch discs and pitch rings.

Generation of axial thrust forces in a planetary transmission is particularly acute when the input shaft, the planetary transmission, and the output shaft are arranged in a vertically oriented drive train. When the input shaft and the output shaft are oriented vertically, downward axial thrust is generated between planetary ring gears and the outer, inner-toothed ring gear by the inherent weight of the carrier, planetary ring gears, and other vertically stacked drive train components.

With the prior art pitch discs and pitch rings described above, the tips of planetary ring gear teeth transmit axial thrust by abutting the outer pitch rings, and the tips of the outer, inner-toothed ring gear teeth transmit axial thrust by abutting the planetary pitch discs. Thus, the sides of the gear tips are continually rubbed by the discs and the rings. The faster the planetary gear system revolves, the more the gear tips are subjected to frictional wear.

Accordingly, it is a primary object of the present invention to provide a planetary transmission in which axial thrust forces do not cause relative axial movement between the planetary ring gear and the outer, inner-toothed ring gear.

Another advantage of the present invention is the provision of a planetary transmission in which sides of the gear tips are not subject to excessive wear due to slippage against pitch discs and rings.

Another advantage of the present invention is the provision of a planetary transmission that is not undesirably affected by the inherent axial thrust forces due to the weight of drive train components when the drive train is arranged vertically.

SUMMARY OF THE INVENTION

An improved planetary transmission is provided employing thrust discs having an outer diameter $D_1$ equal to or, preferably, greater than the planetary ring gear tooth-tip circle diameter $D_2$. The improved planetary transmission is also provided with a unified outer ring gear assembly having side annular ring parts having inner diameter $D_3$ which is equal to or, preferably, greater than the tooth-bottom circle diameter $D_4$ of the outer, inner-toothed annular ring gear. As the transmission operates, the thrust discs and side annular ring parts rotate and contact each other.

Preferably, the thrust discs and side annular ring parts have complementary contact surfaces. The contact surfaces may be cylindrical or frustoconical. When frustoconical, the contact surfaces may have either a positive or negative frustoconical angle.

Because the outer diameter $D_1$ of the thrust discs is equal to or greater than the tooth-tip circle diameter $D_2$ of the planetary ring gear, the thrust discs prevent axial thrust forces from causing relative axial movement between the planetary ring gear and the outer, inner-toothed ring gear. Thus, problems resulting from gear misalignments caused by axial thrust forces are precluded.

By having the outer diameter $D_1$ of the thrust discs equal to or greater than the diameter $D_2$ of the tooth-tip circle of the planetary ring gear, the thrust discs contact the entire side surface of the planetary ring gear, not just the side surface of the gear tip; and, the sides of the gear tips are not excessively worn due to slippage and axial thrust forces present when the gears are rotating.

As D1 is greater than D2 and as the difference between D1 and D2 increases, the surface area of contact between the sides of the thrust discs and the sides of the outer, inner-toothed ring gear increases. The increased surface area of contact results in an increased surface area for axial thrust forces to be distributed over. The increased area of force distribution has the effect of reducing the intensity of the frictional forces per unit of surface area. At the same time the overall area of contact increases, the relative proportion of the area of contact between the sides of the gear teeth and the total area of contact decreases. Since the side surfaces of the gear teeth receive less intense frictional rubbing, the wear and defacement of the teeth sides is decreased.

When the input shaft, planetary transmission, and the output shaft are arranged vertically, the inherent weight of the carrier or planetary gears acts on the meshing gears between the planetary ring gears and the outer, inner-toothed ring gear and brings about axial thrust. In accordance with the principles of this invention, however, the thrust discs sandwich the outer ring gear therebetween, and any axial thrust transmitted to the planetary ring gears is transmitted by the thrust discs to the outer, inner-toothed ring gear. Therefore, the relative position between the planetary ring gears and the outer ring gear does not change in a vertically disposed drive train.

As mentioned above, when a prior art pitch circle method type of planetary transmission is employed, undesirable axial thrust forces can be transmitted when the pitch discs of the planetary ring gears and the pitch rings of the outer ring gear contact each other on the pitch circles. In the pitch method, pitch discs and pitch rings contact only the sides of the tooth-tips (tips out of the pitch circle) of the meshing gears. Since the thickness of gear tooth tips is generally less than the thickness of the gear teeth at the pitch circle and at the tooth-bottom, the tooth-tips of both the planetary ring gear and the outer ring gear are more susceptible to frictional wear as they undergo frictional contact.

With the invention, however, the thrust discs contact the whole side of both the planetary ring gear tooth and the outer, inner-toothed ring gear tooth, and the sides of the gear teeth are less susceptible to frictional wear.

BRIEF DESCRIPTION OF THE DRAWINGS

The foregoing and other objects, features, and advantages of the invention will be apparent from the more specific description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
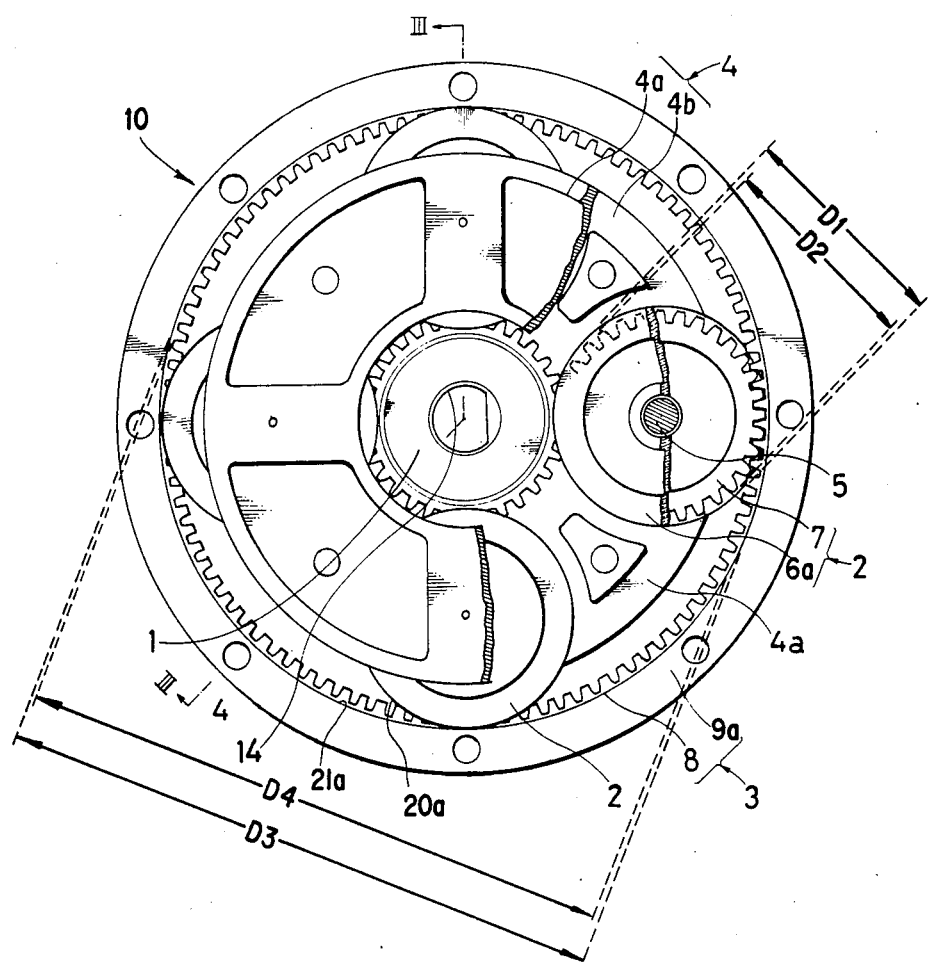
FIG. 1 is a partially open front view of a planetary transmission embodiment of the invention.
Figure 2:
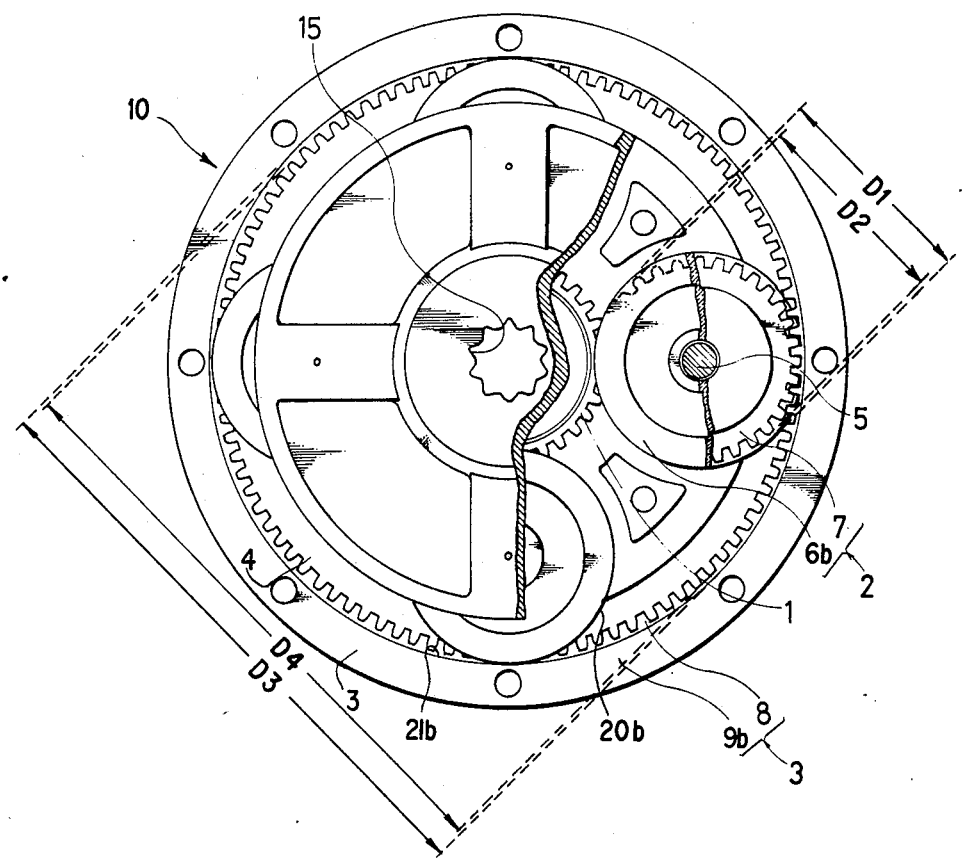
FIG. 2 is a partially opened back view of the embodiment of the invention in FIG. 1.

Referring to FIGS. 1 and 2, a planetary transmission 10 is comprised of a sun gear 1 at the center; several planetary gear assemblies 2 which are axially symmetric to each other around the sun gear 1; a unified outer, inner-toothed ring gear assembly 3 engaging the planetary gear assemblies 2; and a carrier assembly 4 supporting the planetary gear assemblies 2 by planetary shafts 5 at axially symmetric positions. Planetary shafts 5 support planetary gear assemblies 2 and allow them to rotate freely within the carrier assembly 4.

In accordance with the embodiment of the invention illustrated in FIGS. 1 and 2, a planetary gear assembly 2 is comprised of front and back planetary thrust discs 6a and 6b with an outer-toothed planetary ring gear 7 sandwiched therebetween. Planetary shafts 5 pass through front and back planetary thrust discs 6a and 6b.

Preferably, the outer diameter D1 of the thrust discs 6a and 6b is greater than the diameter D2 of the tooth-tip circle (addendum circle) of the planetary ring gear 7.

The unified outer, inner-toothed ring gear assembly 3 is comprised of front and back side annular ring parts 9a and 9b and an inner-toothed annular ring gear part 8 between the side annular ring parts 9a and 9b.

Preferably, the inner diameter D3 of the side annular ring parts 9a and 9b is greater than the diameter D4 of the tooth-bottom circle (dedendum circle) of the outer, inner-toothed annular ring gear 8.

Figure 5:
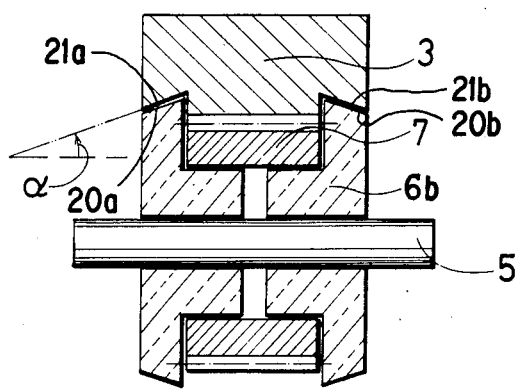
FIG. 5 is an enlarged sectional view of an embodiment of the invention wherein the outer circumferential surface of a thrust disc and the inner circumferential surface of a side annular ring part of the unified outer ring gear assembly are frustoconically shaped, and the frustoconical angle $\alpha$ to the shaft is positive.
Figure 6:
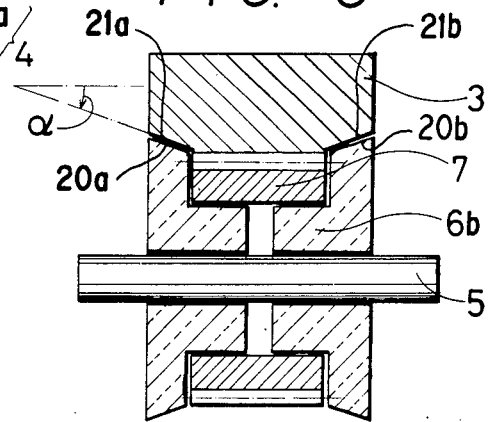
FIG. 6 is an enlarged sectional view of an embodiment of the invention wherein the outer circumferential surface of a thrust disc and the inner circumferential surface of the side annular ring part of the unified outer ring gear assembly are frustoconocially shaped, and the frustoconical angle to the shaft is negative.
Figure 7:
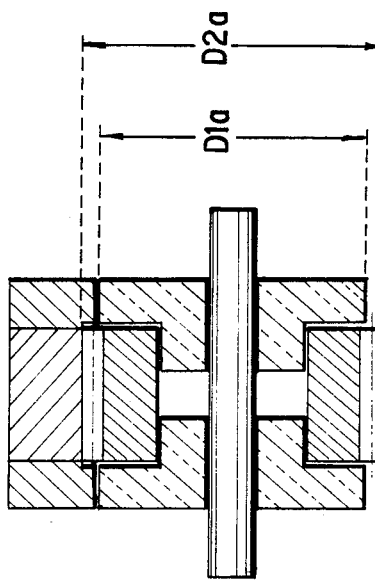
FIG. 7 is an enlarged sectional view of a PRIOR ART planetary transmission employing the pitch circle method.

The planetary ring gears 7 and the outer, inner-toothed ring gear 8 transmit rotation by engaging with each other. At the same time, as shown in FIGS. 4–6, outer thrust surfaces 20a and 20b of the thrust discs 6a and 6b and inner thrust surfaces 21a and 21b of the outer side annular ring parts 9a and 9b contact each other.

Figure 3:
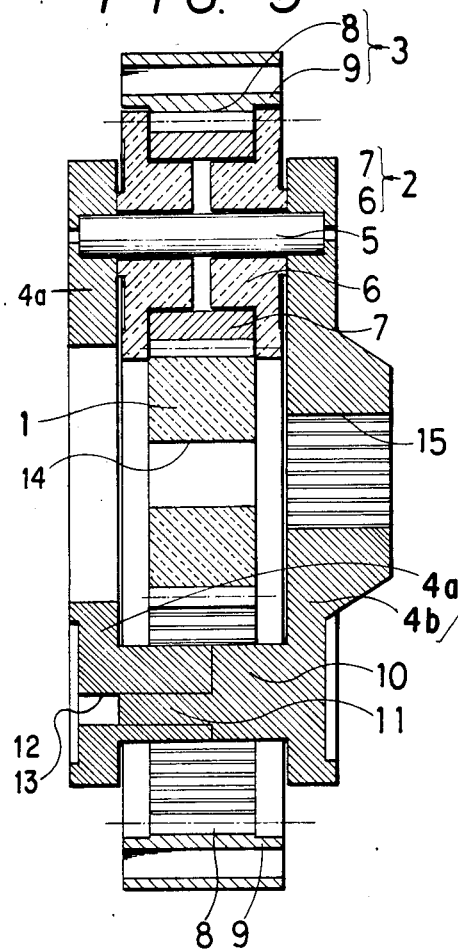
FIG. 3 is a sectional view of an embodiment of the invention taken along the line III in FIG. 1.

As shown in FIG. 3, the carrier assembly 4 is comprised of front and back carrier discs 4a and 4b. The back carrier disc 4b has a projection 10 and a plug 11 on its inner side; and the front carrier disc 4a has a projection 12 and socket 13 on its inner side. The front and back carrier discs 4a and 4b are unified into an integrated structure by inserting the plug 11 into the socket 13.

The sun gear 1 has a sun gear shaft hole 14 at the center which is structured to prevent rotary slippage. The back carrier disc 4b has a carrier shaft hole 15 having a spline or other suitable structure for preventing rotary slippage.

Figure 4:
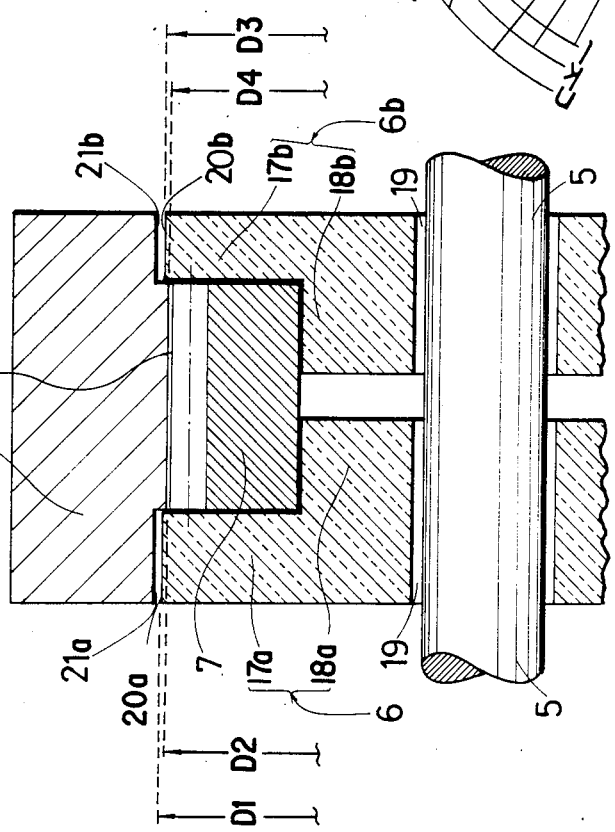
FIG. 4 is an enlarged sectional view of an embodiment of the invention.

FIG. 4 is an enlargement of the top portion of the view shown in FIG. 3. The front and back planetary thrust discs 6a and 6b are circular and have cylindrical boss projections 18a and 18b extending internally parallel to the shaft 5 with an inner hole 19 at the center for the planetary shaft 5 to pass through. The cylindrical boss projections 18a and 18b support the planetary ring gear 7.

The front and back planetary thrust discs 6a and 6b also have radially projecting thrust projections 17a and 17b which project perpendicularly with respect to the shaft 5. The thrust discs outer diameter D1 is greater than the tooth-tip circle diameter D2 of planetary ring gear 7. The diameter D1 may be equal to the tooth-bottom circle diameter D4 of the outer, inner-toothed ring gear 8; but preferably, diameter D1 is greater than diameter D4. In either case, the outer thrust disc thrust surfaces 20a and 20b of thrust projections 17a and 17b extend beyond the tooth-tip circle of the outer, inner-toothed ring gear 8 of the unified outer ring gear assembly 3. Thus, the teeth of outer, inner-tooth ring gear 8 are sandwiched between thrust projections 17a and 17b.

The boss projections 18a and 18b of thrust discs 6a and 6b are inserted into the planetary ring gear 7. Preferably, thrust discs 6a and 6b and planetary ring gear 7 rotate at the same speed under most operating conditions. Preferably, a clearance is provided between the inner circumferential surface of planetary ring gear 7 and the outer circumferential surface of boss projections 18a and 18b to provide slippage for idling.

The outer thrust surfaces 20a and 20b of the thrust disc projections 17a and 17b and the side annular ring part surfaces 21a and 21b of the side annular ring parts 9a and 9b are surfaces which rotate and which contact each other when rotating. During rotation, effects of centrifugal force are received at the thrust disc surfaces 20a and 20b and the side annular ring part surfaces 21a and 21b.

The thrust disc surfaces 20a and 20b and the side annular ring part surfaces 21a and 21b are cylindrical in the embodiments shown in FIGS. 1–4. Surfaces 20a, 20b, 21a, and 21b, can also be formed in other shapes.

FIG. 5 and FIG. 6 are enlarged sectional views of embodiments of the invention in which thrust disc surfaces 20a and 20b and side annular ring part surfaces 21a and 21b are frustoconical.

In FIG. 5, the angle α of the conical frustum of the thrust surfaces 20a and 21a to the shaft 5 is positive. With the embodiment of the invention shown in FIG. 5, thrust discs 6a and 6b are pushed closer to each other by the action of the positively angled conical frustum thrust surfaces 20a and 21a during operation of the planetary transmission.

In FIG. 6, the angle α of the conical frustum of the thrust surfaces 20a and 21a to the shaft 5 is negative.

Figure 8:
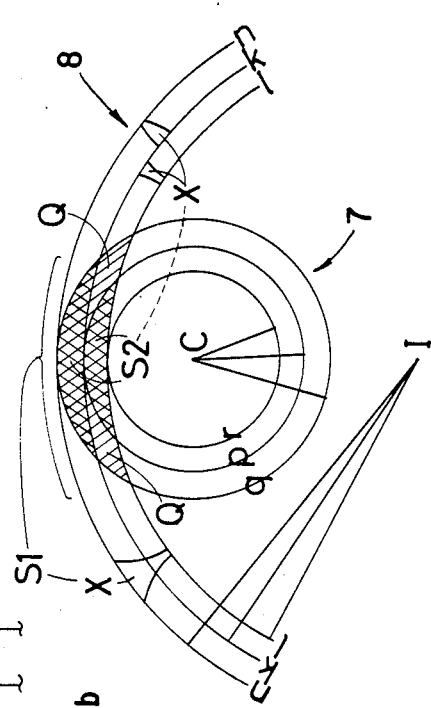
FIG. 8 is a schematic drawing of pitch circles and associated tooth-tip circles and tooth-root circles of a planetary ring gear and the outer, inner-toothed ring gear.

FIG. 8 is a schematic drawing of the pitch circles, tooth-tip circles, and complementary tooth-root circles of a planetary ring gear and the outer, inner-toothed ring gear.

Point C is the center of a planetary ring gear 7; p is a portion of the planetary ring gear pitch circle; and, q is a portion of the planetary ring gear tooth-tip circle (addendum circle).

Point I is the center of an outer, inner-toothed ring gear 8; k is a portion of the outer ring gear pitch circle; and, 1 is a portion of the outer ring gear tooth-tip circle (addendum circle).

Circle r is inscribed around center C, but circle r is not the tooth-bottom circle of the planetary ring gear 7. Instead the radius of circle r represents the distance between center C and the tooth-tip circle 1 of the outer, inner-tooth ring gear. Circle r is called the planetary ring gear tooth root circle.

Circle n has I as it center but is not equal to the tooth-bottom circle (dedendum circle) of the outer, inner-toothed ring gear 8. Instead, the radius of circle n represents the extent to which the tooth-tip circle q of the planetary ring gear 7 extends into the outer, inner-toothed ring gear 8. Circle n is called the outer ring gear tooth-root circle.

In accordance with the principles of the invention, the diameter D1 of a thrust disc is equal to or greater than the diameter of the tooth-tip circle q of a planetary ring gear 7.

Only for purposes of explanation of the principles of the invention, an example is considered where the thrust disc diameter D1 is equal to (not greater than which is preferred) the diameter of the tooth-tip circle q. The contacting surface S1 between the outer ring gear 8 and a thrust disc is a crescent area (oblique-lined) bounded by circle 1 and circle q.

In contrast with the prior art planetary transmission employing the pitch circle method, the contacting surface coverage between a side surface of the outer teeth of the outer ring gear 8 and a pitch disc would be the crescent area bounded by circle p and circle 1; and, the contacting area between side surfaces of the outer teeth of the planetary ring gear 7 and a pitch ring would be the crescent area bounded by circle q and circle k. By employing the principles of the invention, the total contact area coverage between the pitch discs and the planetary gear teeth sides and the outer ring gear teeth sides is oblique-lined area S1. By employing the prior art pitch circle method, the area of contact is cross-striped region S2. It is apparent that contacting surface area S1 in accordance with the invention is greater than contacting surface area S2 following the pitch circle method. The prior art contacting area S2 (cross-striped) is smaller than the contacting area S1 of the invention by two quadrilateral regions Q. Thus, a transmission made in accordance with the principles of the invention described herein will receive axial thrust over a larger surface area than in prior art transmissions.

In addition, the actual contacting area is in proportion to the products of these areas S1, S2 and the circumferential thickness of the teeth. As the tooth thickness near the tooth bottom is relatively large with the invention, the product of S1 and the circumferential thickness of the outer, inner-toothed ring gear is also relatively large.

The contacting surface between the ring gear 8 and a thrust disc in accordance with the invention is larger than the contact area using a prior art pitch circle method. When the axial thrust per unit area of the sides of gear teeth is relatively small, the frictional forces resulting in wear of the gear teeth are also relatively small.

The unified outer, inner-toothed ring gear assembly made in accordance with the principles of the invention may be fabricated from plastic, and may be made by a jet-forming method. The side annular ring parts and the outer ring gear may be incorporated into a single unit by the jet-stream method. By having the essential parts made from plastic, the production costs of the transmission units are considerably reduced.

In assembling a carrier assembly shown in FIG. 3, front and back carrier parts may be unified employing adhesive materials. Alternatively, the tip of plug 11 may be melted into the socket 13 employing supersonic waves. This method is applicable to plastic carrier discs. Carrier discs may also be made from metal in which case the carrier discs may be welded or riveted together.

Numerous benefits are obtained by employing the principles of the invention. Preferably, the diameter D1 of thrust projection 17a and 17b is greater than the diameter D2 of the tooth tip circle (addendum circle) of the planetary ring gear 7 and reaches beyond the bottom-circle (dedendum circle) of the outer, inner-toothed ring gear 8. In this way, thrust discs 6a and 6b contact not only the entire sidewalls of the meshing gear teeth, but also contact a portion of the sidewall of the outer ring gear 8, thereby spreading frictional forces over a wider area and decreasing wear on the sidewalls of the gear teeth. Because thrust discs 6a and 6b extend to the bottom-circle of the outer, inner-toothed ring gear 8 and beyond and because the meshing gears between the planetary ring gear 7 and the outer ring gear 8 are sandwiched between the thrust discs 6a and 6b, relative axial movement between the meshing gears is precluded.

The foregoing description of the novel planetary transmission of the invention has been present for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The embodiments of the invention is which an exclusive property or privilege is claimed are defined by the following:

1. A planetary transmission, comprising:
    a sun gear;
    at least one planetary gear assembly engaging said sun gear, said planetary gear assembly having a planetary ring gear between two thrust discs;
    a carrier assembly supporting said planetary gear assembly by planetary shaft means;
    a rotatable unified outer, inner-toothed annular one-piece ring gear assembly engaging said planetary gear assembly, said unified annular ring gear assembly comprised of an inner-toothed ring gear part between two non-toothed side annular ring parts;
    wherein said thrust discs are in contact with said side annular ring parts; wherein the thrust discs outer diameter D1 is equal to or greater than the planetary ring gear tooth-tip circle diameter D2;
    wherein the thrust ring inner diameter D3 of the side annular ring parts is equal to or greater than the tooth-bottom circle diameter D4 of said outer, inner-toothed annular ring gear part;
    wherein said thrust discs and said side annular ring parts have complementary contact surfaces; and
    wherein said complementary contact surfaces are complementary frustoconical surfaces and wherein the frustoconical angle is positive.

2. A planetary transmission, comprising:
    a sun gear;
    at least one planetary gear assembly engaging said sun gear, said planetary gear assembly having a planetary ring gear between two thrust discs;
    a carrier assembly supporting said planetary gear assembly by planetary shaft means; and
    a rotatable unified outer, inner-toothed annular one-piece ring gear assembly engaging said planetary gear assembly, said unified annular ring gear assembly comprised of an inner-tooth ring gear part between two non-toothed side annular ring parts;
    wherein said thrust discs are in contact with said side annular ring parts; wherein the thrust discs outer diameter D1 is equal to or greater than the planetary ring gear tooth-tip circle diameter D2;
    wherein the thrust ring inner diameter D3 of the side annular ring parts is equal to or greater than the tooth-bottom circle diameter D4 of said outer, inner-toothed annular ring gear part;
    wherein said thrust discs and said side annular ring parts have complementary contact surfaces; and,
    wherein said complementary contact surfaces are complementary frustoconical surfaces and wherein the frustoconical angle is negative.

3. A unified inner-toothed one-piece unitary ring gear assembly, comprising:
    an inner-toothed ring gear part between two non-toothed side annular ring parts wherein the inner diameter D3 of said side annular ring parts is equal to or greater than the diameter D4 of the tooth-bottom circle of said inner-toothed ring gear part; and,
    wherein the thrust surfaces of said side annular ring parts are frustoconical.

4. An inner-toothed ring gear assembly as described in claim 3, wherein the frustoconical angle is negative.

5. An inner-toothed ring gear assembly as described in claim 3, wherein the frustoconical angle is positive.

6. A planetary transmission, comprising:
    a sun gear;
    at least one planetary gear assembly engaging said sun gear, said planetary gear assembly having a planetary ring gear between two thrust discs;
    a carrier assembly supporting said planetary gear assembly by planetary shaft means; and
    a rotatable unified outer, inner-toothed annular one-piece ring gear assembly engaging said planetary gear assembly, said unified annular ring gear assembly comprised of an inner-toothed ring gear part between two non-toothed side annular ring parts;
    wherein said thrust discs are in contact with said side annular ring parts; and,
    wherein said thrust discs and said side annular ring parts have complementary frustoconical contact surfaces.

7. An inner-toothed ring gear assembly as described in claim 3, wherein the frustoconical angle is negative.

8. An inner-toothed ring gear assembly as described in claim 3, wherein the frustoconical angle is positive.

* * * * *